(12) United States Patent
Gan et al.

(10) Patent No.: US 8,729,745 B2
(45) Date of Patent: May 20, 2014

(54) MULTIPLE-PHASE LINEAR SWITCHED RELUCTANCE MOTOR

(75) Inventors: Wai Chuen Gan, Kowloon (HK); Gary Peter Widdowson, Mid Levels (HK); Siu Yan Ho, Mongkok (HK)

(73) Assignee: ASM Assembly Automation Ltd, Hong Kong (HK)

( * ) Notice: Subject to any disclaimer, the term of this patent is extended or adjusted under 35 U.S.C. 154(b) by 513 days.

(21) Appl. No.: 12/910,969

(22) Filed: Oct. 25, 2010

(65) Prior Publication Data
US 2012/0098355 A1    Apr. 26, 2012

(51) Int. Cl.
  *H02K 41/02*    (2006.01)
  *H02K 41/03*    (2006.01)

(52) U.S. Cl.
  USPC ............... 310/12.22; 310/12.18; 310/12.19; 318/135

(58) Field of Classification Search
  USPC ............. 310/12.17–12.19, 12.21, 12.22; 318/135
  See application file for complete search history.

(56) References Cited

U.S. PATENT DOCUMENTS

| | | | |
|---|---|---|---|
| 5,703,457 A * | 12/1997 | Davis | 318/701 |
| 6,078,114 A | 6/2000 | Bessette et al. | |
| 6,624,538 B2 | 9/2003 | Janisiewicz et al. | |
| 2001/0026101 A1 * | 10/2001 | Janisiewicz et al. | 310/12 |
| 2006/0006743 A1 * | 1/2006 | Kawai et al. | 310/12 |
| 2006/0076839 A1 * | 4/2006 | Kawai | 310/12 |
| 2006/0091755 A1 * | 5/2006 | Carlisle | 310/168 |

FOREIGN PATENT DOCUMENTS

JP    2002101636 A  *  4/2002  ............ H02K 41/03

OTHER PUBLICATIONS

Shikayama, JP2002101636A Machine Translation, Apr. 2002.*

* cited by examiner

*Primary Examiner* — Burton Mullins
*Assistant Examiner* — Eric Johnson
(74) *Attorney, Agent, or Firm* — Ostrolenk Faber LLP

(57) ABSTRACT

A linear switched reluctance motor comprises a movable coil bracket including first and second coil assemblies. Each of the first and second coil assemblies further comprises a plurality of coils separately wound around a plurality of motor coil cores, each of the coils being configured to receive a sinusoidal current at a different phase from other coils comprised in the same coil assembly. Tooth members of a stator track are located adjacent to the motor coil cores such that a magnetic flux path is created which passes through the motor coil core, the stator track and an air gap between the motor coil core and the stator track. A multiple-phase motor driver electrically connected to the first and second coil assemblies generates symmetric multiple-phase sinusoidal currents for driving the motor.

10 Claims, 4 Drawing Sheets

MULTIPLE-PHASE LINEAR SWITCHED RELUCTANCE MOTOR

FIELD OF THE INVENTION

The invention relates to a switched reluctance motor, and in particular to a switched reluctance motor which provides linear bidirectional driving forces using switched or variable reluctance principles.

BACKGROUND AND PRIOR ART

A switched reluctance motor is a synchronous motor that has wound field coils as in a DC motor for its stator windings. However, the switched reluctance motor has no permanent magnets attached. The motor is doubly salient with phase coils mounted around diametrically opposite stator poles. Energisation of a phase of the coil windings will lead to an armature moving into alignment with the stator poles, thereby minimising the reluctance of a magnetic path and producing a torque to drive the armature. In order to achieve full translation of the armature, the coil windings must be energised in a predetermined sequence.

A typical linear switched reluctance motor topology is a unipolar current-driven device. An example of such a motor is disclosed in U.S. Pat. No. 6,078,114 entitled "Method and Apparatus for Vibration Reduction/Control in a Variable Reluctance Linear Motor" wherein a variable reluctance linear motor is described which has a stator, and an armature which is mounted so as to be movable along the length of the stator. Another example is U.S. Pat. No. 6,624,538 entitled "Variable Reluctance Motor with Improved Tooth Geometry" which describes a variable reluctance motor with motor and stator cores comprising base members and a plurality of adjacent tooth members having unique tooth geometries.

The aforesaid prior art documents disclose the traditional approach of obtaining continuous magnetomotive bidirectional forces in a linear switched reluctance motor. This approach differs from a traditional servo motor in that the currents which are provided to three different phases of the motor are non-linear. In addition, the phase inductance variation has a highly non-linear relationship with position. This makes its control more demanding, which tends to produce inferior positioning performance as compared to a servo motor drive. A significant drawback to its widespread adoption has been the unique nature of the driver topology which is necessary to achieve accurate positioning performance. Special, tailor-made drives are required, and they tend to be expensive to implement.

SUMMARY OF THE INVENTION

It is thus an object of the invention to seek to provide a linear switched reluctance motor that can be driven by a standard three-phase bridge and a sinusoidal commutation algorithm to avoid the above shortcomings of conventional linear switched reluctance motors.

Accordingly, the invention provides a linear switched reluctance motor comprising: a movable coil bracket including first and second coil assemblies, each of the first and second coil assemblies further comprising a plurality of coils separately wound around a plurality of motor coil cores, each of the coils being configured to receive a sinusoidal current at a different phase from other coils comprised in the same coil assembly; a stator track comprising tooth members which are located adjacent to the motor coil cores such that a magnetic flux path is created which passes through the motor coil core, the stator track and an air gap between the motor coil core and the stator track; and a multiple-phase motor driver electrically connected to the first and second coil assemblies that is operative to generate symmetric multiple-phase sinusoidal currents.

It would be convenient hereinafter to describe the invention in greater detail by reference to the accompanying drawings which illustrates a preferred embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of a motor in accordance with the invention will now be described with reference to the accompanying drawings, in which.

DETAILED DESCRIPTION OF THE PREFERRED EMBODIMENT OF THE INVENTION

Figure 1:
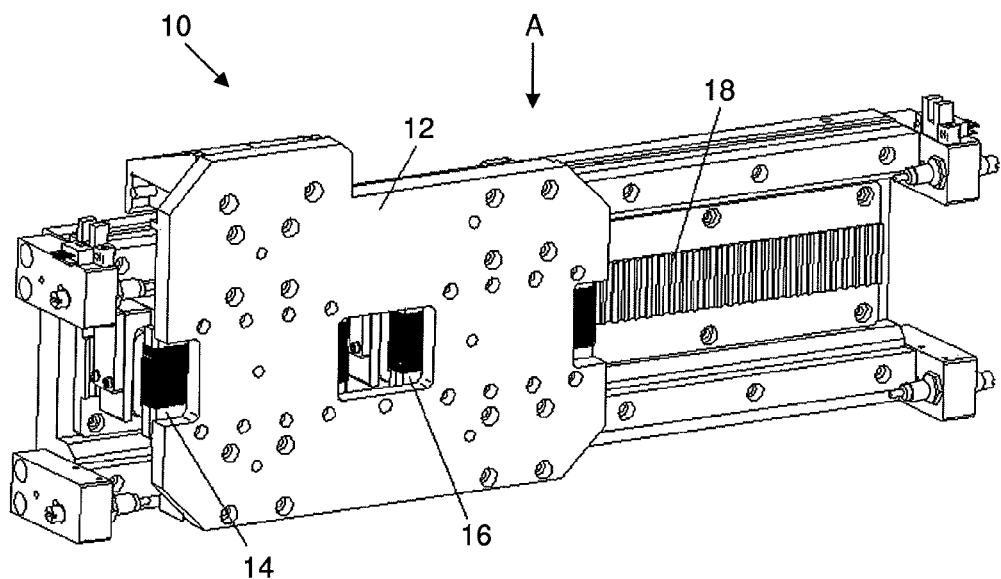
FIG. 1 is an isometric view of a linear switched reluctance motor ("LSRM") according to the preferred embodiment of the invention.

FIG. 1 is an isometric view of an LSRM 10 according to the preferred embodiment of the invention. The LSRM 10 comprises a movable coil bracket 12, two sets of coil assemblies 14, 16, as well as a stator track 18. There is generally no need for any permanent magnet in the construction of the LSRM 10.

Figure 2:
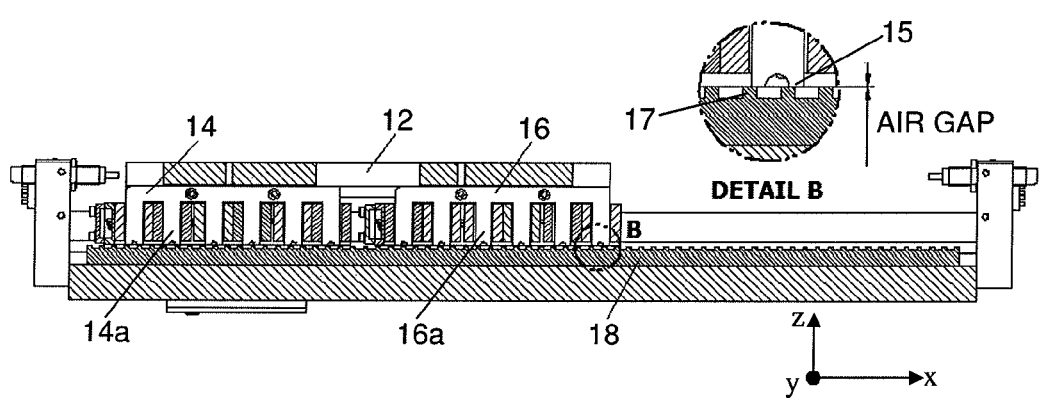
FIG. 2 is a cross-sectional view of the LSRM looking from direction A of FIG. 1.

FIG. 2 is a cross-sectional view of the LSRM 10 looking from direction A of FIG. 1, which shows a relative position between the movable coil assemblies 14, 16 and the stator track 18. A force in an X direction is generated using switched reluctance or variable reluctance principles. A magnetic circuit is implemented to minimize a reluctance of the LSRM 10. The coil assemblies 14, 16 include motor coil cores 14a, 16a that are made of laminated silicon steel while the stator track 18 can be made of solid electrical steel or laminated silicon steel. The coil bracket 12, as well as the stator track 18, is arranged with a plurality of tooth members 15, 17 in the X direction. In particular, each motor coil core 14a, 16a further comprises a plurality of tooth members 15 facing the tooth members 17 of the stator track (see Detail B of FIG. 2). A magnetic path is created by first generating a current into one of the coil assemblies 14, 16. A magnetic flux will be set up which passes through the motor coil core 14a, 16a of the respective coil assembly 14, 16, an air gap (see Detail B), stator track 18, back to the air gap, and finally returning to the motor coil core 14a, 16a to complete the magnetic path.

Figure 3:
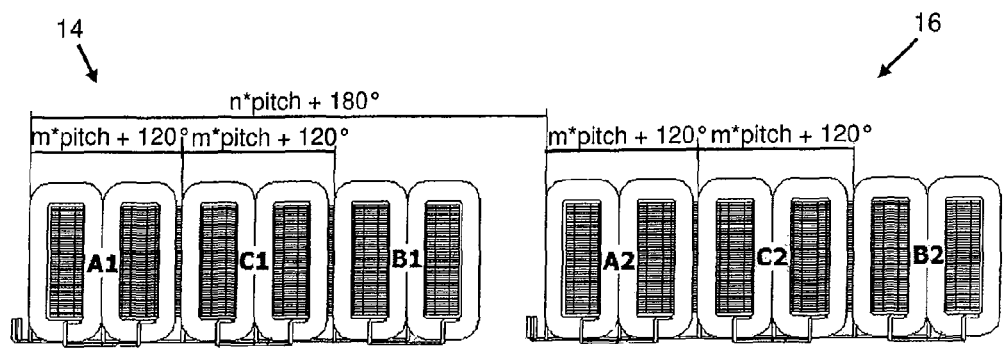
FIG. 3 is the side view of the coil arrangement of the LSRM.

FIG. 3 is the side view of the coil arrangement of the LSRM 10. In the described embodiment, six coils are employed.

There are three coils (A1, B1 and C1) associated with the first coil assembly 14 and another three coils (A2, B2 and C2) associated with the second coil assembly 16. The respective coils in the first coil assembly 14 are uniformly separated by 120 electrical degrees from each other. The respective coils in the second coil assembly 16 are also uniformly separated by 120 electrical degrees. However, the electrical separation between the first and second coil assemblies 14, 16, specifically the corresponding coils in the first and second coil assemblies 14, 16 that are electrically connected to each other, must be 180 electrical degrees or any of its odd multiples.

Assuming that the coil bracket 12 is at electrical position zero, when the current in phase coil B1 is energized in either a positive or negative direction, there is a positive force generated. If an equal but opposite force is required to be generated at electrical position zero, one option is to energize the phase coil B2 that is electrically connected to phase coil B1 with an equal magnitude of current, again either positive or negative. Phase coil B2 will thereby produce a force that is in an opposite direction to the force produced in phase coil B1. This is applicable to any position of the coil bracket 12. Using the above principle, bidirectional forces can be produced at any electrical position using standard three-phase driver technology. Therefore, the LSRM 10 may be driven by a standard multiple-phase motor driver electrically connected to the first and second coil assemblies 14, 16 that is operative to generate symmetric multiple-phase sinusoidal currents, instead of a more expensive asymmetric motor.

Figure 4:
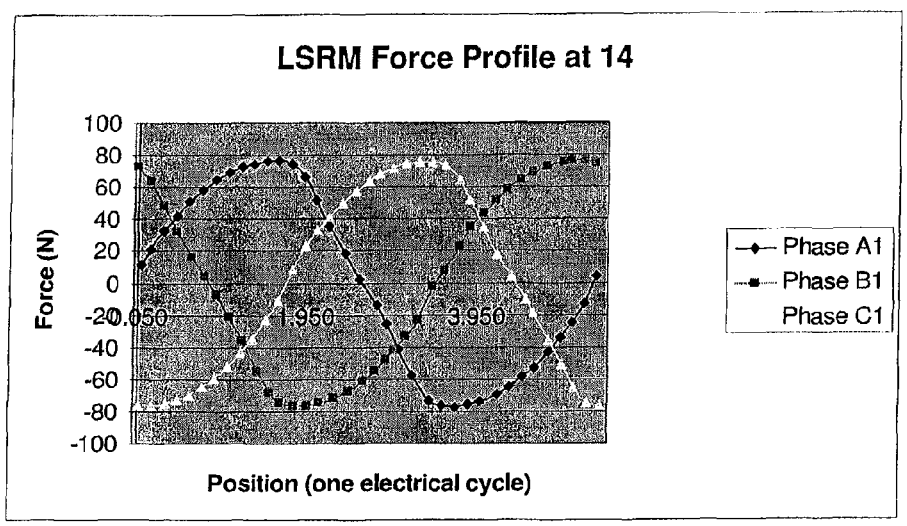
FIG. 4 is an example of a force profile of force against electrical position at a first coil assembly of the LSRM at a certain direct current input.

FIG. 4 is an example of a force profile of force against electrical position at the first coil assembly 14 of the LSRM 10 at a certain direct current input. A typical X direction phasor force profile between the first coil assembly 14 and the stator track 18 is produced under direct current excitation over one magnetic pitch. This is the same as that for a standard switched reluctance three-phase motor. In this example, the individual phase coils are named as A1, B1 and C1 in the first coil assembly 14.

Since the X direction linear force created by the coil assemblies 14, 16 and the stator track 18 is generated by way of switched reluctance or variable reluctance principles, a reverse in current polarity does not produce a reverse of the generated force at any motor position. The direction of the force generated is instead determined by the electrical positions of the respective coil assemblies 14, 16. For example, phase coil A1 produces a positive force from 0 to 180 electrical degrees and a negative force from 180 to 360 degrees, as shown in FIG. 4.

Figure 5:
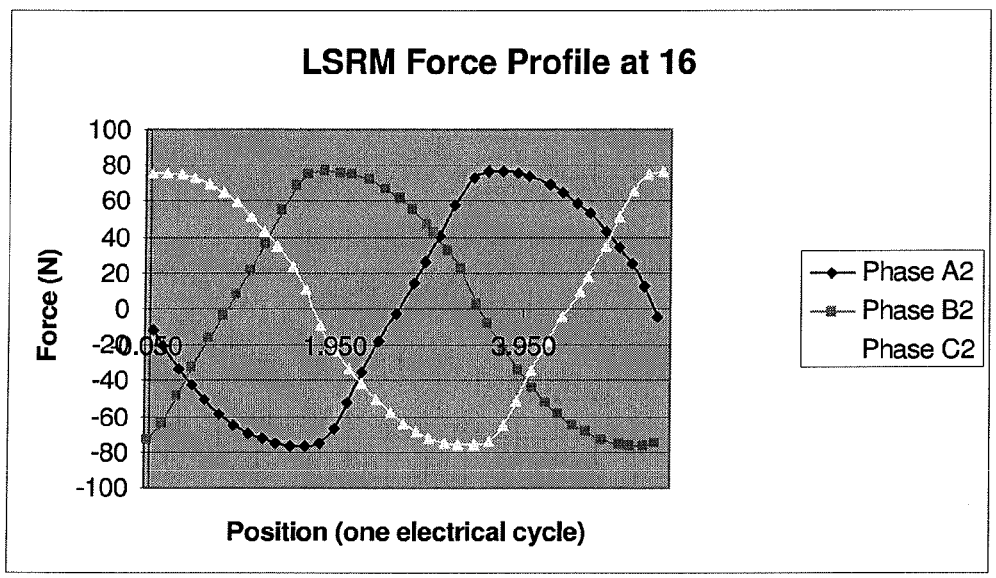
FIG. 5 is an example of a force profile of force versus electrical position at a second coil assembly of the LSRM at a certain direct current input.

FIG. 5 is an example of a force profile of force versus electrical position at the second coil assembly 16 of the LSRM 10 at a certain direct current input. It shows a typical X direction phasor force profile produced between the second coil assembly 16 and the stator track 18, which is a y-axis mirror of FIG. 4. In this example, the individual phase coils are named as A2, B2 and C2 in the second coil assembly 16. It would be noted that an electrical degree of separation of a sinusoidal current in one coil A1, B1, C1 and a sinusoidal current in another coil A1, B1, C1 in the same coil assembly 14, 16 is always uniform in use.

Figure 6:
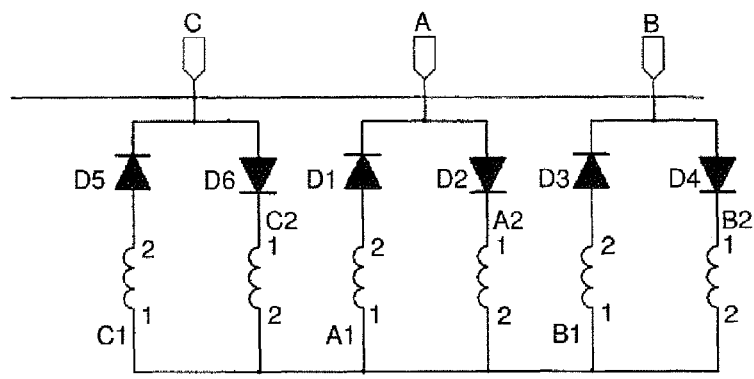
FIG. 6 illustrates an electrical connection between the first and second coil assemblies of the LSRM which includes six diodes.

FIG. 6 illustrates an electrical connection between the first and second coil assemblies 14, 16 of the LSRM 10 which includes six diodes D1-D6. In order to fully utilize the above novel feature, the coil assemblies 14, 16 are connected with the six diodes D1-D6. There are three new terminals, A, B and C that are created from the arrangement. These terminals are the same as the usual three phase motor terminals of other types of motors, and they allow bipolar currents to pass through the first and second coil assemblies 14, 16. Each of the diodes D1-D6 is connected between each respective terminal A, B, C and a coil.

For the commutation of the currents in the LSRM 10, a traditional sinusoidal commutation algorithm for permanent magnet synchronous motors can be employed. Expressed in terms of mathematical equations, the phase currents are set to:

$$I_a = I_q \sin x$$

$$I_b = I_q \sin(x+120°)$$

$$I_c = I_q \sin(x-120°)$$

where x is an electrical position from 0 to 360° and $I_q$ is a control variable. The motor force generation is provided as follows, $$f = I_a f_a(x, I_a) + I_b f_b(x, I_b) + I_c f_c(x, I_c)$$

where $f_i(x, I_i)$ and i=a, b, c are the phase force generation functions, and f is the generated electromechanical force. Supposing that:

$$f_a(x, I_a) = k_f \sin x$$

$$f_b(x, I_b) = k_f \sin(x+120°)$$

$$f_c(x, I_c) = k_f \sin(x-120°)$$

where $k_f$ is the force constant, then $$f = k_f I_q$$

Figure 7:
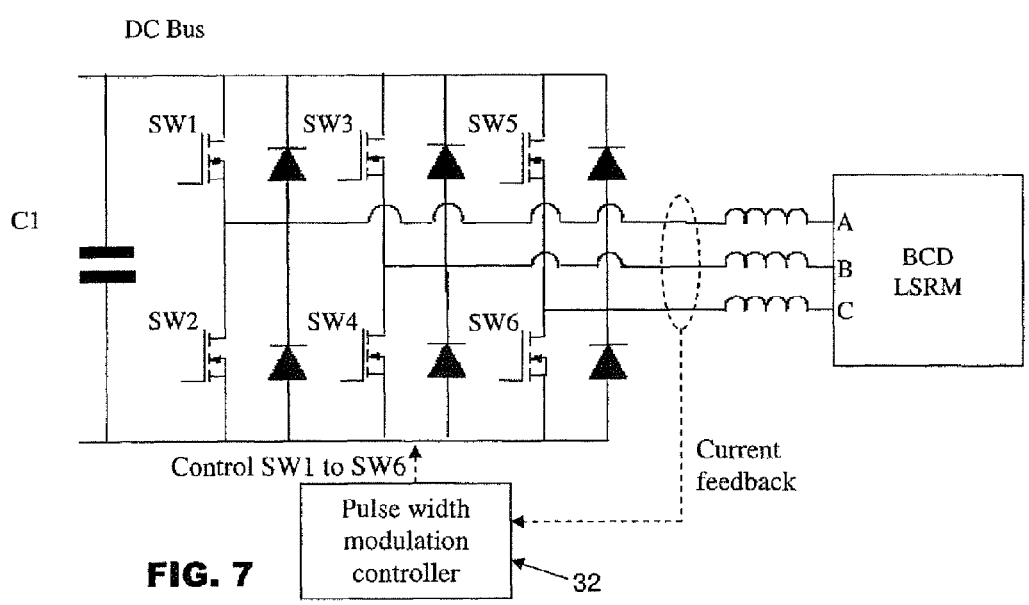
FIG. 7 illustrates an electrical connection of the LSRM including a standard three-phase bridge.

FIG. 7 illustrates an electrical connection of the LSRM 10 including a standard multiple-phase bridge including multiple terminals equal to the number of phases of the multiple phase motor driver, which in the preferred embodiment is a three-phase bridge. Each terminal connects the multiple-phase motor driver to a coil in each of the first and second coil assemblies 14, 16. With the aforesaid sinusoidal commutation algorithm and the proposed electrical connection including diodes as shown in FIG. 6, the LSRM 10 can now be driven by a standard three-phase bridge as shown in FIG. 7. The three-phase bridge is a standard off-the-shelf component that is being mass-produced by many semiconductor manufacturers and is easily available. Therefore, the cost is much reduced in comparison to asymmetrical bridges that are commonly used in driving linear switched reluctance motors.

There are six switches SW1 to SW6, as shown in FIG. 7, to form a standard three-phase bridge. SW1 and SW2, SW3 and SW4, as well as SW5 and SW6 comprise three half-bridges. The half-bridges are each connected to a diode in parallel, and the center points of each half-bridge create the motor connection terminals A, B and C. With a proper Pulse Width Modulation (PWM) controller 32 on these six switches, sinusoidal currents can be tracked at the three motor terminals. The capacitor C1 is used as an energy storage device and to transfer energy from a main DC bus.

It should be appreciated that the invention allows for a more cost-effective driving scheme for linear switched reluctance motors. Its advantage over conventional driving schemes is that the preferred embodiment of the invention allows the user to adopt standard motion controllers and standard motor drivers for the motor. This leads to substantial cost reduction. In addition, the LSRM 10 can be used as a replacement for linear permanent magnet motors without any hardware modifications other than substituting the motor itself.

The invention described herein is susceptible to variations, modifications and/or additions other than those specifically described and it is to be understood that the invention includes all such variations, modifications and/or additions which fall within the spirit and scope of the above description.

The invention claimed is:

1. A linear switched reluctance motor comprising:
   a movable coil bracket including first and second coil assemblies, each of the first and second coil assemblies further comprising a plurality of coils, each coil separately wound around a respective plurality of motor coil cores, each of the coils being configured to receive a sinusoidal current at a different phase from other coils comprised in the same coil assembly, the number of coils in the first coil assembly being equal to the number of coils in the second coil assembly, and each of the coils in the first coil assembly being electrically connected to a separate one of the coils in the second coil assembly;
   a stator track comprising tooth members which are located adjacent to the motor coil cores such that a magnetic flux path is created which passes through the motor coil core, the stator track and an air gap between the motor coil core and the stator track; and
   a multiple-phase motor driver electrically connected to the first and second coil assemblies that is operative to generate symmetric multiple-phase sinusoidal currents,
   wherein an electrical degree of separation between a first coil in the first coil assembly and a second coil in the second coil assembly that is electrically connected to the first coil is 180 electrical degrees or odd multiples of 180 electrical degrees and,
   wherein each motor coil core further comprises a plurality of tooth members facing the tooth members of the stator track.

2. The linear switched reluctance motor as claimed in claim 1, wherein the movable coil bracket is configured such that an electrical position of the coil assemblies is operative to determine a direction of a force generated on the movable coil bracket.

3. The linear switched reluctance motor as claimed in claim 1, wherein an electrical degree of separation of a sinusoidal current in one coil of the first or second coil assembly and a sinusoidal current in another coil in the same electrical coil assembly is always uniform in use.

4. The linear switched reluctance motor as claimed in claim 1, wherein a coil in the first coil assembly is operative to generate a force that is equal and opposite to a force generated by a corresponding coil in the second coil assembly that is electrically connected to it, by providing equal magnitudes of current in both coils.

5. The linear switched reluctance motor as claimed in claim 1, further comprising a multiple-phase bridge including multiple terminals equal to the number of phases of the multiple-phase motor driver, each terminal connecting the multiple-phase motor driver to a coil in each of the first and second coil assemblies.

6. The linear switched reluctance motor as claimed in claim 5, further comprising a diode connected between each respective terminal and a coil.

7. The linear switched reluctance motor as claimed in claim 5, further comprising switches forming a half-bridge that is connected to each diode in parallel.

8. The linear switched reluctance motor as claimed in claim 7, further comprising a pulse width modulation controller connected to each switch that is operative to track a sinusoidal current at each terminal.

9. The linear switched reluctance motor as claimed in claim 1, wherein the motor coil core is made of laminated silicon steel.

10. The linear switched reluctance motor as claimed in claim 1, wherein the stator track is made of electrical steel or laminated silicon steel.

* * * * *